April 28, 1925.  
H. S. THOMAS ET AL  
1,535,876  
APPARATUS FOR USE IN THE MANUFACTURE OF TIN PLATES OR SHEETS  
Filed March 23, 1922  2 Sheets-Sheet 2
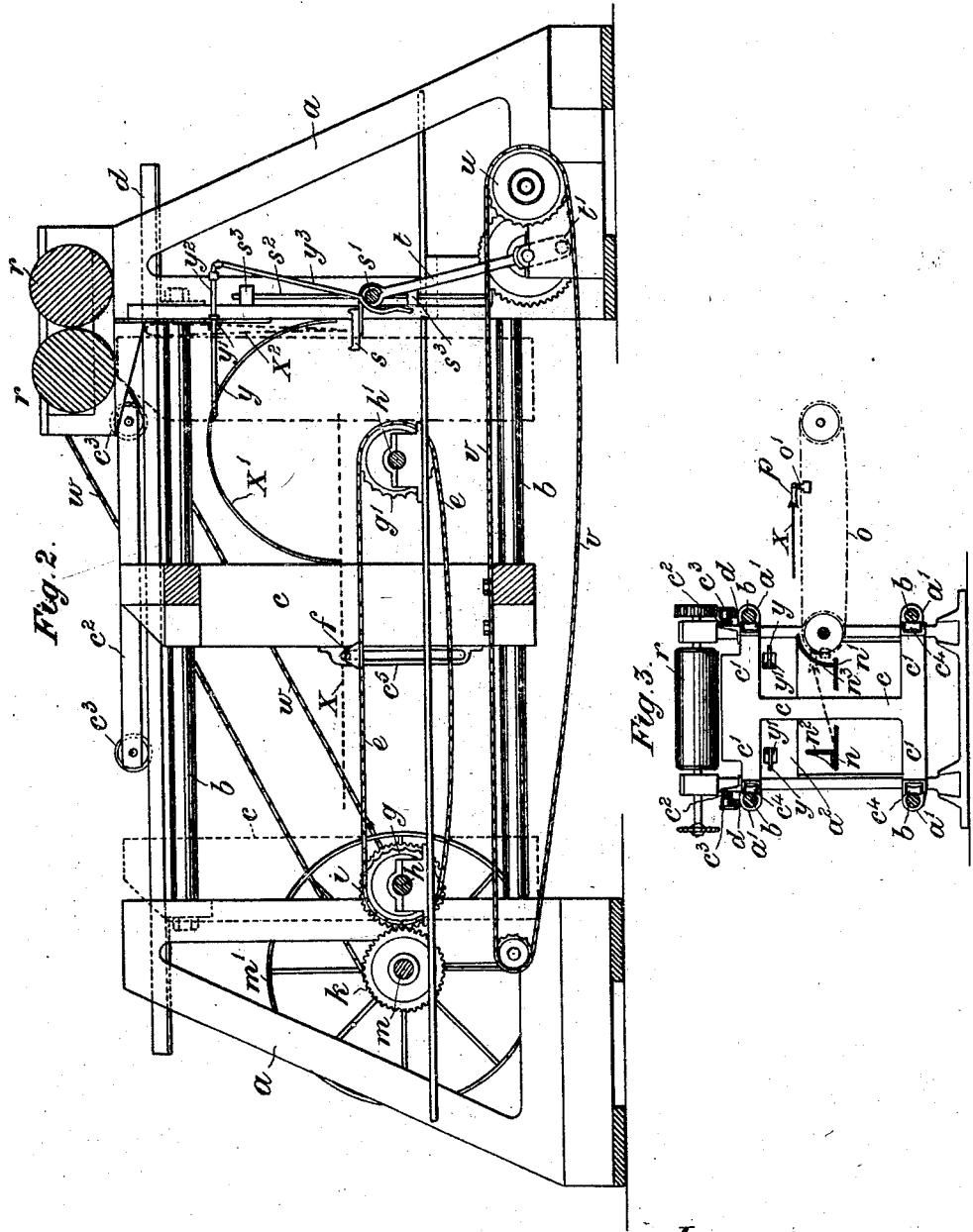

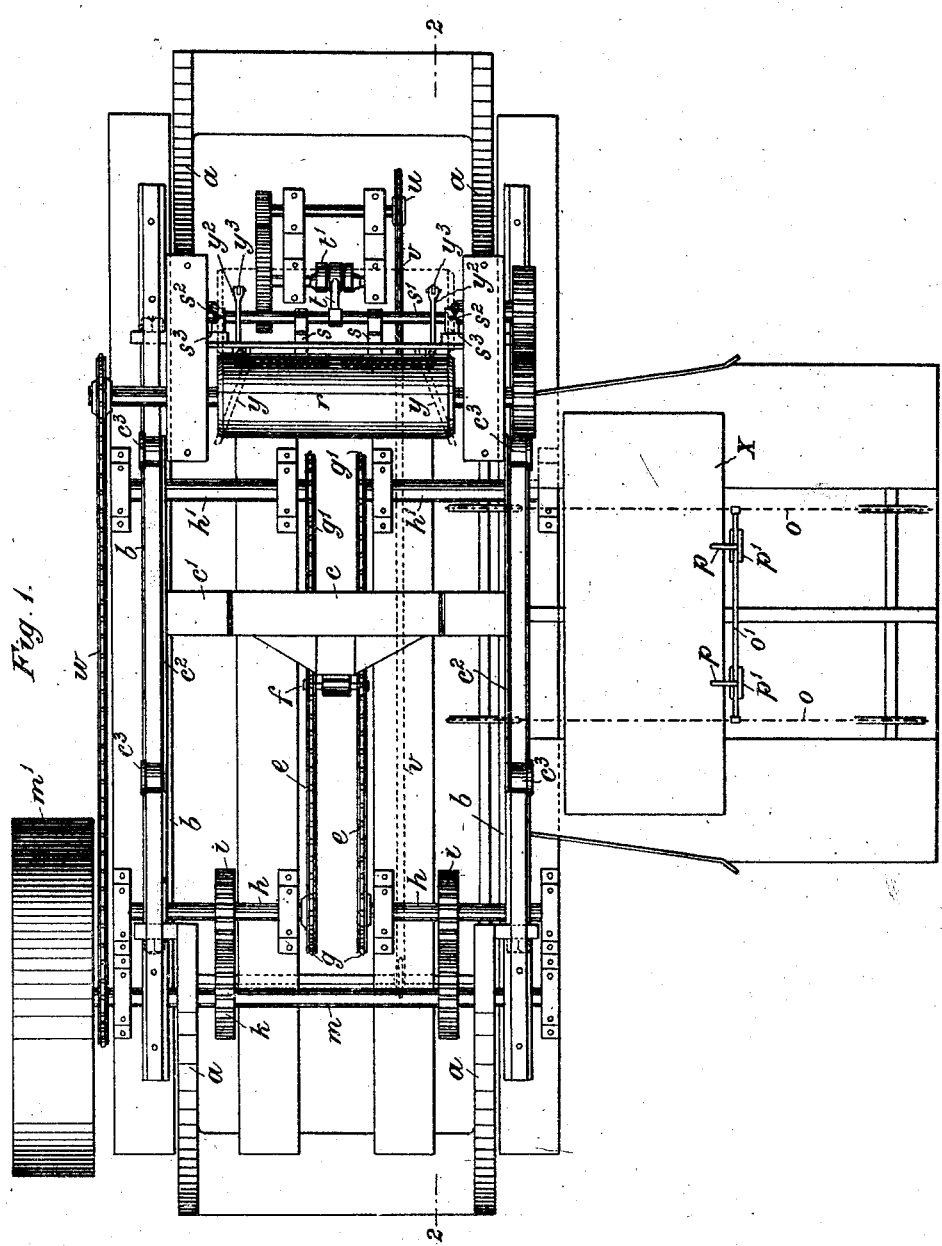

Patented Apr. 28, 1925.

1,535,876

UNITED STATES PATENT OFFICE.

HUBERT SPENCE THOMAS, OF LLANDAFF, NEAR CARDIFF, AND WILLIAM ROBERT DAVIES, OF WHITCHURCH, NEAR CARDIFF, WALES.

APPARATUS FOR USE IN THE MANUFACTURE OF TIN PLATES OR SHEETS.

Application filed March 23, 1922. Serial No. 546,145.

*To all whom it may concern:*

Be it known that we, HUBERT SPENCE THOMAS and WILLIAM ROBERT DAVIES, subjects of the King of Great Britain, residing at Llandaff, near Cardiff, and Whitchurch, near Cardiff, Wales, respectively, have invented certain new and useful Improvements in Apparatus for Use in the Manufacture of Tin Plates or Sheets, of which the following is a specification.

Our invention relates to the manufacture of tin-plates, sheets or the like and more particularly to an apparatus for effecting the preliminary processes to which the piece or bar of steel, from which the plates or sheets are formed is subjected in order to obtain from the bar what are technically known as "black plates" or "sheets".

In order that the invention may be the better understood we remark that, according to the ordinary process of producing "black plates" or "sheets", the piece or bar of steel, after being heated and rolled to a predetermined length, is doubled over on itself and folded at the middle or thereabouts to form a two ply sheet which is returned to the furnace and reheated. Another rolling, another doubling and then another heating are usually effected and the said processes are repeated until the number of layers or plies in the pack reaches the number desired for the particular class of plate or sheet to be produced. No hard and fast rule as to the number of doubling operations exists, but when the pack contains the required or desired number of plies or layers it is trimmed and the plies are pulled apart, each ply affording a single black plate or sheet.

The doubling operation referred to, which is work of a laborious nature, is commonly performed by hand labour, but mechanical means have been proposed for carrying the doubling operation into effect.

Sometimes the steel bars are rolled out and "matched", one on top of the other, by the rollerman and then rolled out before the sheets or plates are "doubled".

Our invention provides mechanical means for effecting the said doubling operation, and an important feature of the invention is that the plate to be doubled is submitted to end pressure so applied as to cause the plate to fold at its middle or thereabouts, as may be desired, in a plane at right angles to the direction of pressure, the ends of the plate on which the pressure means act being brought together, or approximately together, when the pressure exerting means have completed the bending or doubling operation. Side pressure means or guides are provided to retain the plate in proper position during the doubling operation, and there may be combined with the doubling machine mechanism whereby the doubled plate or sheet can be removed therefrom and transferred to any desired point in the mill.

We will further describe our invention in connection with the accompanying drawings which represent convenient mechanism or machinery for carrying the invention into effect.

Figure 1 is a plan of the said mechanism or machinery, certain parts hereinafter referred to and seen in the other figures being omitted.

Fig. 2 is a longitudinal section on the plane indicated by the dotted line 2—2 of Fig. 1, and Fig. 3, which is drawn to a smaller scale than Figs. 1 and 2, is a cross sectional view illustrating only certain particular parts, hereinafter referred to, of the mechanism or machinery.

The same letters of reference indicate the same parts in the several figures of the drawings.

$a, a$ are end standards or castings for the support of the shafting and other parts of the machinery hereinafter described, the said standards or castings being connected near their upper and lower ends by pairs of rods $b, b, b, b$ secured in laterally projecting lugs $a^1$ on the standards and best seen in Fig. 3.

Between the said standards $a, a$ is arranged the movable standard, column or bar $c$, by the motion of which in one direction the end pressure is applied to the plate to be folded or doubled, the said movable column or bar being shown in Fig. 2 in three positions, viz: in its initial position indicated by dotted lines at the left hand side of the figure, in an intermediate position, shown in full lines, and in the position which it occupies when it has fully completed its travel in the direction proper for effecting the folding or doubling of the plate or sheet. In the latter position the standard or column is indicated by the dot and dash lines at the right hand side of the figure.

The support and guidance of the pressure exerting member $c$ in its travelling motion may be effected by providing thereon laterally projecting arms $c^1$, $c^1$ (best seen in Fig. 3), the arms at the upper end having attached thereto bars $c^2$ carrying rollers $c^3$, $c^3$ which rest and travel on the longitudinally arranged rails or tracks $d$, $d$ which are conveniently carried by the lugs $a^1$ at the upper ends of the standards $a$. In order to further ensure that the said bar $c$ shall preserve its correct position and to secure smooth working, the laterally projecting arms $c^1$, $c^1$ thereof at both its upper and lower ends are fitted provided with rollers $c^4$, $c^4$, which are mounted on vertical spindles and take a bearing against the longitudinal rods $b$ connecting the standards $a$ together.

The travelling motion of the member $c$ may be effected in various ways, as for example by a hydraulic ram or by the mechanism illustrated in the drawing, which comprises a pair of endless chains $e$, $e$ to which are connected the respective ends of a cross pin or rod $f$ which passes through the slotted guide $c^5$ on the rear side of the said pressure member $c$.

The said endless chains $e$, $e$ are supported by and travel over the sprocket wheels $g$, $g^1$ carried by spindles $h$, $h^1$ supported in suitable bearings or plummer blocks, the spindles $h$ of the sprockets $g$ having thereon spur wheels $i$ in mesh with spur wheels $k$ on the cross shaft $m$. The cross shaft $m$ is driven by the belt pulley $m^1$ or is otherwise rotated to effect the travelling in the one or the other direction of the pressure member $c$.

The plate to be folded or doubled, and which is marked X in the drawings, is delivered on to a supporting platform consisting of two or any number of strips or bars (seen only in cross section in Figures 3 and marked respectively $n$, $n^1$), the said platform strips or bars being arranged horizontally between the standards $a$ and separated a distance apart sufficient to permit the passage of the movable pressure exerting member or members between them.

The platform strip or bar $n$ has thereon a longitudinal vertical bar or web $n^2$ which forms a positioning stop or abutment capable of adjustment for the longitudinal edge of the plate or sheet delivered on to the platform, and the strip, or bar $n^1$ carries a curved guide plate or strip $n^3$ over which the opposite longitudinal edge of the plate or sheet travels down on to the platform, the distance between the positioning parts $n^2$, $n^3$ being approximately equal to the width of the plate or sheets to be operated on, so that the said parts serve to minimize lateral movement of the sheets during the endwise pressure to which they are subjected in the folding or doubling operation.

The delivery of the plates on to the platform of the machine can be effected directly by hand or by feeding them singly and automatically, or by hand, on to the endless chain conveyors $o$, $o$ carrying a spindle $o^1$ on which are mounted fingers or prongs $p$ for engagement with the edge of the plate, the said fingers or prongs having counterbalance weights $p^1$ which preserve them in correct position to engage the plate X.

A plate X is shown in position on the conveyor chains $o$, $o$ in Figs. 1 and 3 and is indicated in dotted lines about to be delivered on to the platform in Fig. 3.

The platform $n^1$ and guide $n^3$ are notched or slotted to permit the passage of the fingers $p$ and, when the plate is positioned on the platform, the fingers by the continued rotation of the conveyor chains are removed from engagement with the plate and travel back to the position in which they engage the next succeeding plate to be fed to the platform of the machine.

The plate X is indicated in dotted lines in Fig. 2 in the position it occupies when delivered on to the platform $n$, $n^1$ when the pressure column $c$ is in its initial position, as indicated in dotted lines in the said figure.

On the forward motion of the pressure exerting column $c$ the front and rear edges of the plate are respectively brought into contact with the said column and the rear fixed standard $a$, and while the said edges remain in contact with the platform or held by suitable adjustable carriers on the columns, the plate is gradually bent or arched, as will be understood by examination of Fig. 2 in which the plate is seen in full lines marked $x^1$ in the arched form which it has assumed when the pressure member $c$ has travelled to a midway position. When the said member $c$ has completed its forward stroke the plate is completely doubled on itself, as indicated in the dot and dash lines marked $X^2$ in Fig. 2, and occupies the position shown between the pressure member $c$ and rear fixed standard $a$.

For the purpose of improving the fold of the plate or sheet and also to facilitate its transfer from the doubling machine, we may provide above the rear standard $a$ a pair of transversely disposed rolls $r$, $r$ one only of which is seen in the plan Fig. 1, the other roller (indicated in dotted lines in the said figure) being removed the better to disclose mechanism situated below the rolls and hereinafter referred to.

As will be seen from Fig. 2, in which the said rolls appear in section, the nip of the rolls is situated vertically, or approximately vertically, above the doubled edge of the plate or sheet and the bent sheet may be lifted into the nip of the rolls by hooks or arms $s$ on a rod $s^1$ situated below the lower edge of the plate and actuated to effect the lifting operation by the connecting rod $t$ of a crank $t^1$. The said rod $s^1$ is positioned and guided in its rising and falling motions by the vertical guide rods $s^2$, $s^2$ one, at each end thereof, which rods slide in the lugs or bearings $s^3$, $s^3$ fixed to a convenient part of the machine. The shaft of the crank $t^1$ is driven by spur gearing from the spindle of the sprocket wheel $u$, the said sprocket $u$ gearing with the chain $v$ which is attached to the moving pressure member $c$, and travels therewith, and the said sprocket is constructed to run free on its spindle when rotated by the forward travel of the pressure member and to come into clutch with its spindle when the chain rotates in the opposite direction on the return motion of the said pressure member; that is to say, the crank $t^1$ and connecting rod $t$ are operated only on the return stroke of the bar $c$ and raise the doubled plate into the nip of the rolls $r$ by which it can be directed to a travelling band or other conveyor for transferring it to a shearing machine or to a furnace or to any other desired point in the mill for further treatment or storage.

The rotation of the rolls $r$, $r$ may be effected by gearing one of them by the chain $w$ to a driving sprocket on the shaft $m$.

To hold the plate in a vertical position when the pressure of the bar or member $c$ is removed therefrom on the return stroke, we provide a pair of gripping arms or clips $y$, $y$ pivoted at $y^1$, $y^1$ in gaps in the plate $a^2$ so as to be capable of turning in a horizontal plane, the said arms having cranked ends projecting through the gaps to the rear side of the plate and connected to rods $y^2$ actuated for effecting the turning of the arms or clips $y$ into the gripping position by the pressure of the crank operated rod $s^1$ on the depending inclined rods $y^3$, the rod $s^1$ sliding up the said inclined rods $y^3$ when the said rod $s^1$ is lifted on the commencement of the return stroke or back motion of the column or pressure exerting member $c$.

We wish it to be understood that we do not limit ourselves to the precise construction and arrangement or combination of the parts of the bending or doubling mechanism described as the same may be varied without departing from the nature of our invention, for example, the plate or sheet lifting mechanism described and shown may be replaced by equivalent eccentric or cam operated mechanism; and, as before stated, the pressure exerting member $c$ may be actuated by hydraulic or steam pressure controlled mechanism, in which case the overhead travelling gear $c^2$, $c^3$ which is provided where a chain drive is employed to give rigidity to the column and obviate the effect of variation of the centre of pressure, may be dispensed with. Only one vertical column $c$ is shown on plan, but to meet varying conditions any number of columns may be desirable to widen the point of pressure on wider sheets.

Further, two movable columns or end pressure exerting members may be provided instead of the one movable column $c$ as herein described, in which event the said movable columns would be disposed relative to fixed standards or supports for the head of the apparatus. By this means a speeding up of the bending operation may be effected.

Claims:—

1. In a machine for use in the manufacture of tin-plates, sheets or the like embodying means for mechanically conveying and feeding the plate or sheet to be folded into the machine, means for applying end pressure to the said plate or sheet so as to effect a folding thereof, and means for transferring the folded plate or sheet in preparation for a re-folding or subsequent operation.

2. A machine for use in the manufacture of tin-plates, sheets or the like, comprising means for applying end pressure to the plate or sheet so as to effect a folding thereof and means for transferring the folded sheet in preparation for a refolding or subsequent operation.

3. In a machine for the manufacture of tin-plates, sheets or the like embodying mechanical means for conveying and feeding the plate or sheet to be folded into the machine, means for applying end pressure to the said plate or sheet for effecting a folding thereof, means in combination with the said conveying, feeding and folding means for transferring the folded plate or sheet in preparation for a re-folding or subsequent operation and means for compressing the folded plate or sheet to effect completion of the folding operation.

4. In a machine for use in the manufacture of tin-plates, sheets or the like embodying means for applying end pressure to the plate or sheet so as to effect a doubling or folding thereof, means for transferring the folded sheet in preparation for a re-folding or subsequent operation, said tranferring means including rolls into the grip of which the folded sheet is conveyed, said rolls serving to compress the folded plate or sheet and thereby effect completion of the folding operation.

5. A machine of the character described, comprising a frame, a platform supported by said frame, an adjustable abutment on one edge of said platform, a guide on the opposite edge, a member stationary at one end of the platform, and a member movable to and from said stationary member longitudinally of the platform, and means for automatically removing a sheet of metal when bent by said machine during the movement of said movable member away from the stationary member.

In testimony whereof we have hereunto set our hands in presence of two subscribing witnesses.

HUBERT SPENCE THOMAS.
WILLIAM ROBERT DAVIES.

Witnesses:
RAYMOND F. BENCE,
OWEN C. JAMES.